United States Patent [19]
Yerman

[11] Patent Number: 5,240,320
[45] Date of Patent: Aug. 31, 1993

[54] FOOD SERVICE CABINET

[75] Inventor: Donald Yerman, Willoughby, Ohio

[73] Assignee: Crescent Metal Products, Inc., Cleveland, Ohio

[21] Appl. No.: 776,089

[22] Filed: Oct. 11, 1991

[51] Int. Cl.⁵ ............................................. A47B 77/00
[52] U.S. Cl. .............................. 312/351.11; 312/236; 312/244; 312/293.3
[58] Field of Search ............... 312/236, 116, 290, 244, 312/351.11, 320, 313, 323, 322, 293.3

[56] References Cited

U.S. PATENT DOCUMENTS

| | | | |
|---|---|---|---|
| 1,173,002 | 2/1916 | Kennedy | 312/290 |
| 2,778,704 | 1/1957 | Joachim | 312/290 |
| 3,716,282 | 2/1973 | Propst et al. | 312/322 |
| 3,836,220 | 9/1974 | Ishammar . | |
| 3,837,722 | 9/1974 | Ceccarelli | 312/323 |
| 3,895,215 | 7/1975 | Gordon | 312/236 |
| 3,908,749 | 9/1975 | Williams . | |
| 4,285,391 | 8/1981 | Bourner | 312/236 |
| 4,314,734 | 2/1982 | Grunert | 312/323 |
| 4,346,756 | 8/1982 | Dodd et al. | 312/236 |
| 4,544,024 | 10/1985 | Baggott . | |
| 4,892,366 | 1/1990 | Yerman . | |
| 4,945,972 | 8/1990 | Takeuchi | 312/322 |

OTHER PUBLICATIONS

Crescent Metal Products, Inc., Advertising Literature for "Selecta-Bonnet", No. CXO-141-SB.
Crescent Metal Products, Inc., Pamphlet Entitled "Crown-X Mobile 'Cook-Hold' ", No. CX-B-30 and 31-S.
Crescent Metal Products, Inc., Pamphlet Entitled "Crown-X Mobile Convection Oven Cabinet", No. CX-231.
Crescent Metal Products, Inc. Pamphlet Entitled "Refrigerated Cabinet", No. B-29 and 30.
Crescent Metal Products, Inc. Catalog Sheet No. FL-1354-3.
Crescent Metal Products, Inc. Drawing No. B692-38.
Lookwood Manufacturing Co., Product Literature Entitled "Removable Runner Racks" and Universal Removable Runner Rack.

Primary Examiner—Victor N. Sakran
Attorney, Agent, or Firm—Renner, Otto, Boisselle & Sklar

[57] ABSTRACT

A food service cabinet embodies a unique shelf support rail construction and mounting arrangement which provides for easy and quick removal of the shelf support rails for cleaning and/or adjustment, a unique construction of channel members employed in the cabinet as support posts and tray stops, for example, which construction coacts with catches on walls of the cabinet for providing quick and east removable attachment of the channel member to the wall, and a removable top unit for closing an open top of a cabinet enclosure, the top unit forming a continuation of the cabinet enclosure and having essentially full width hand grips integrally embodied in sheet metal side walls of the top unit.

18 Claims, 4 Drawing Sheets

FOOD SERVICE CABINET

The invention herein described relates generally to food service cabinets particularly useful in commercial kitchens or by caterers to facilitate processing and handling of prepared food products.

BACKGROUND

In the food service industry a variety of cabinets have been provided for various purposes. These cabinets include storage, transport and/or busing cabinets, cold cabinets, hot cabinets, refrigerated cabinets, proof cabinets, heat and hold cabinets, warming cabinets, banquet cabinets, etc. Typically, the cabinets stand about 5-7 feet tall, have a depth of about 2-3 feet and come in widths ranging from about 2-6 feet. Both insulated and uninsulated cabinets have been provided, and typically the cabinets have one or more doors opening on the front or back sides.

In these cabinets the food products are usually supported on horizontal shelves arranged vertically from bottom to top within the cabinet. Various types of shelves have been used, these including wire racks, baskets, trays, plate carriers, etc. The shelves are usually supported at opposite side edges thereof on ledges either formed integrally in the sidewalls of the cabinets or attached to the sidewalls of the cabinets. For example, cabinets have been provided with corrugated interior sidewalls wherein the corrugations define a vertical array of equally spaced apart ledges. The ledges also have been formed by angles or pan slides attached to the sidewalls of the cabinet. Although these various types of shelf supports have proven to be effective and successful over the years, there still remains a need for improved alternative means for supporting the shelves in a cabinet. An improved shelf support desirably would be easily removable by a simple manipulation to facilitate removal of the shelf support for cleaning or for shelf height adjustment. Also, an improved shelf support would be relatively economical and easy to fabricate.

In some food service cabinets heated or cooled air is circulated within the cabinet to contact the food to heat or cool the food or to maintain the temperature of the food. In one known type of cabinet an open top of the cabinet is closed by a removable heat transfer unit which is interchangeable with other heat transfer units depending on the particular function to be performed by the cabinet. The heat transfer units which fit on top of the cabinet may be refrigeration or freezer units, warming units or baking units, among others. The heat transfer units typically include an air intake, a fan or fans for circulating air, a heating or cooling device to transfer heat to or from the circulating air, and an outlet for the heated or cooled air. The units are intended to be positioned over and sealed against an opening in the top of the cabinet. The air inlet then communicates directly with the cabinet area while the treated air outlet communicates with a vertically extending duct on the rear wall of the cabinet. The fan or fans draw air from the intake, force it past the heating or cooling device, through the outlet, into the tunnel, and then through many louvers, slots or holes in the duct walls into the interior of the cabinet. In order to hold the heat transfer unit stationary atop the cabinet, latches are provided. It would be desirable to provide interchangeable heat transfer units which are easy to remove from atop the cabinets and which do not require the need for latches to hold the units in place.

Many food service cabinets are provided with a shelf stop on the cabinet doors to prevent forward and rearward shifting of the shelves. These shelf stops may be removable to facilitate cleaning of the cabinet interior. Typically the shelf stops are sheet metal channel members which are punched to form keyholes for mating with pins attached to the inside wall surface of the door. The orientation of the keyhole dictates a top and bottom end of the shelf stop thereby requiring the user to take the time to determine which is the top or bottom end when attaching the shelf stop to the door. It would be desirable to provide an improved means for removably attaching a shelf stop to the inside surface of the cabinet door, as well as other elongate channel members such as posts to inside wall surfaces of the cabinet and which improved means is easy to form in the sheet metal channel members.

SUMMARY OF THE INVENTION

The present invention provides an improved food service cabinet that satisfies one or more of the aforesaid needs or objectives. The food service cabinet in a preferred form embodies a unique shelf support rail construction and mounting arrangement which provides for easy and quick removal of the shelf support rails for cleaning and/or adjustment. The preferred form of food service cabinet further includes a unique construction of channel members employed in the cabinet as support posts and tray stops, for example, which construction coacts with catches on walls of the cabinet for providing quick and easy removable attachment of the channel member to the wall. A further feature of a preferred form of food service cabinet according to the invention is the provision of a removable top unit for closing an open top of a cabinet enclosure, the top unit forming a continuation of the cabinet enclosure and having essentially full width hand grips integrally embodied in sheet metal side walls of the top unit.

More paticularly, a food service cabinet according to one aspect of the invention is characterized by an enclosure, a pair of upright posts in the enclosure, and a shelf support rail for supporting a shelf along an edge of the shelf. The shelf support rail extends horizontally between the upright posts and is removably supported at end portions thereof by the upright posts. Each post has an outer surface coplanar with the outer surface of the other and a horizontal slot extending inwardly from the outer surface of the post to an inner surface of the post which extends upwardly from the horizontal slot. The shelf support rail at least at the end portions thereof are generally L-shape in cross section and have a normally upright leg for interlocking engagement in the horizontal slots in the upright posts and a normally horizontal leg atop which an edge of a shelf may rest and thereby be supported. The normally upright leg is transversely stepped to form an upper upright portion for engaging the inner surface of the post above the horizontal slot, a lower upright portion for engaging the outer surface of the post below the horizontal slot, and an intermediate transversely extending portion joining together the upper and lower upright portions. The intermediate portion extends through the horizontal slot and is supported atop a bottom edge surface of the horizontal slot. The horizontal slot is of sufficient height and sufficient clearance is provided inwardly of the inner surface of the post to allow rotation of the upper upright portion in a direction away from the inner surface of the post about a horizontal axis to an angularly rotated position permitting withdrawal of the normally upright leg from the horizontal slot.

According to another aspect of the invention there is provided in a food service cabinet a wall having an interior surface, at least one catch on the wall, and an upright member attached by the catch or catches to the wall. Each catch has a stem portion extending from the interior surface of the wall and a wider head portion spaced from the interior surface of the wall and forming a slot therebetween. The upright channel member is of generally C-shape cross section and has a pair of legs extending from a base to respective inturned flanges. The inturned flanges include a keyhole for each catch, the keyhole having a lower portion for passage therethrough of the head portion of the catch and a reduced width upper portion for receiving the base. The keyhole is uniquely formed by opposed notches in the inner edges of the inturned flanges. The reduced width upper portion of the keyhole preferably is formed by oppositely sloping shoulder surfaces at the top of the notch in the inturned flanges which oppositely sloping shoulder surfaces engage the stem portion of the catch in a wedge-like manner. Preferably, the notches in the inturned flanges are vertically as well as horizontally symmetrical.

A food service cabinet according to a further aspect of the invention is characterized by an enclosure having an open top, and a removable top unit for closing the open top. The top unit includes hand grips at opposite sheet metal side walls thereof and the hand grips extend substantially the full width of the side walls. Each sheet metal side wall has a lower recessed wall portion from which a laterally extending rim projects to form the hand grip.

The foregoing and other features of the invention are hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
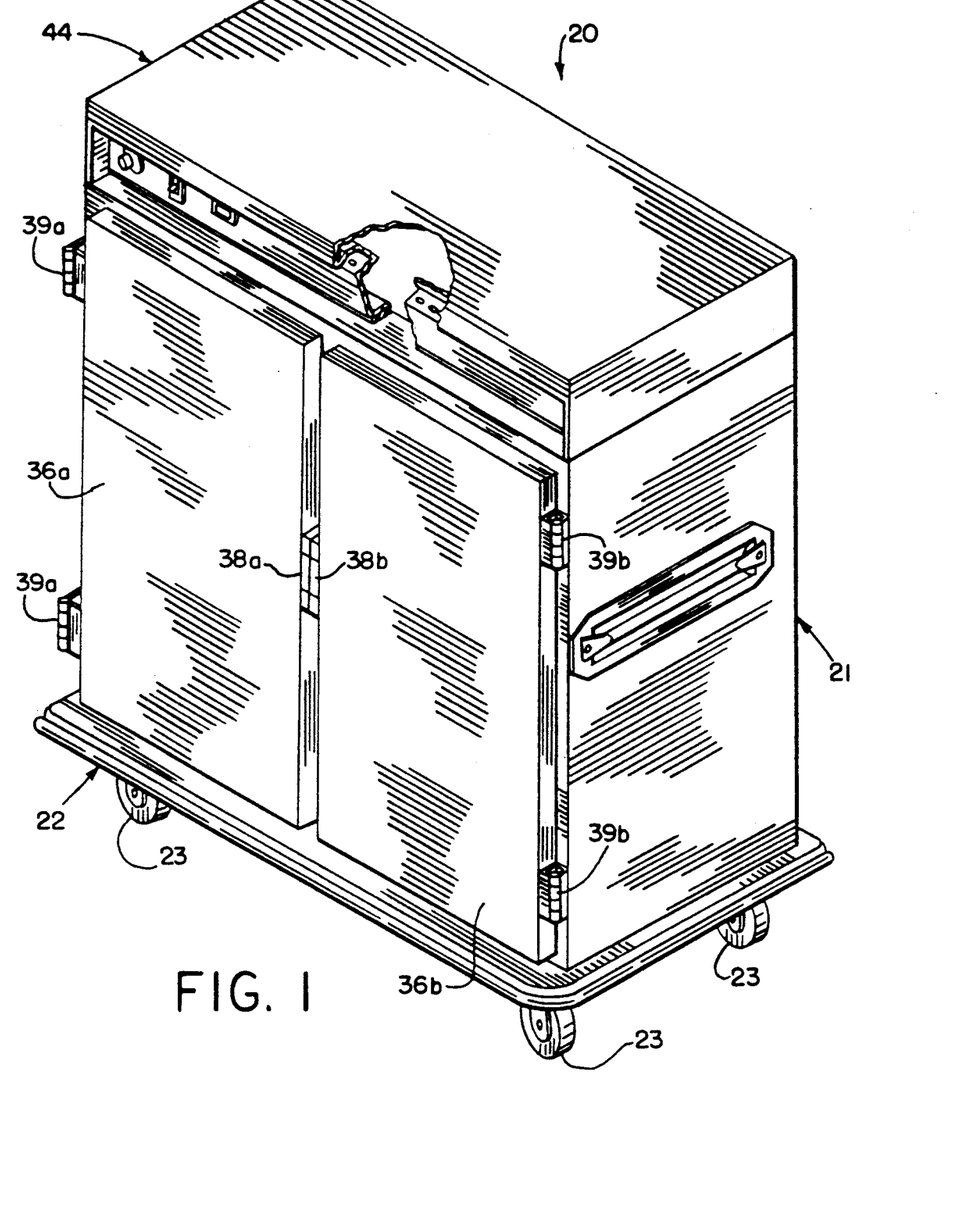
FIG. 1 is a perspective view of a preferred embodiment of food service cabinet according to the invention.
Figure 2:
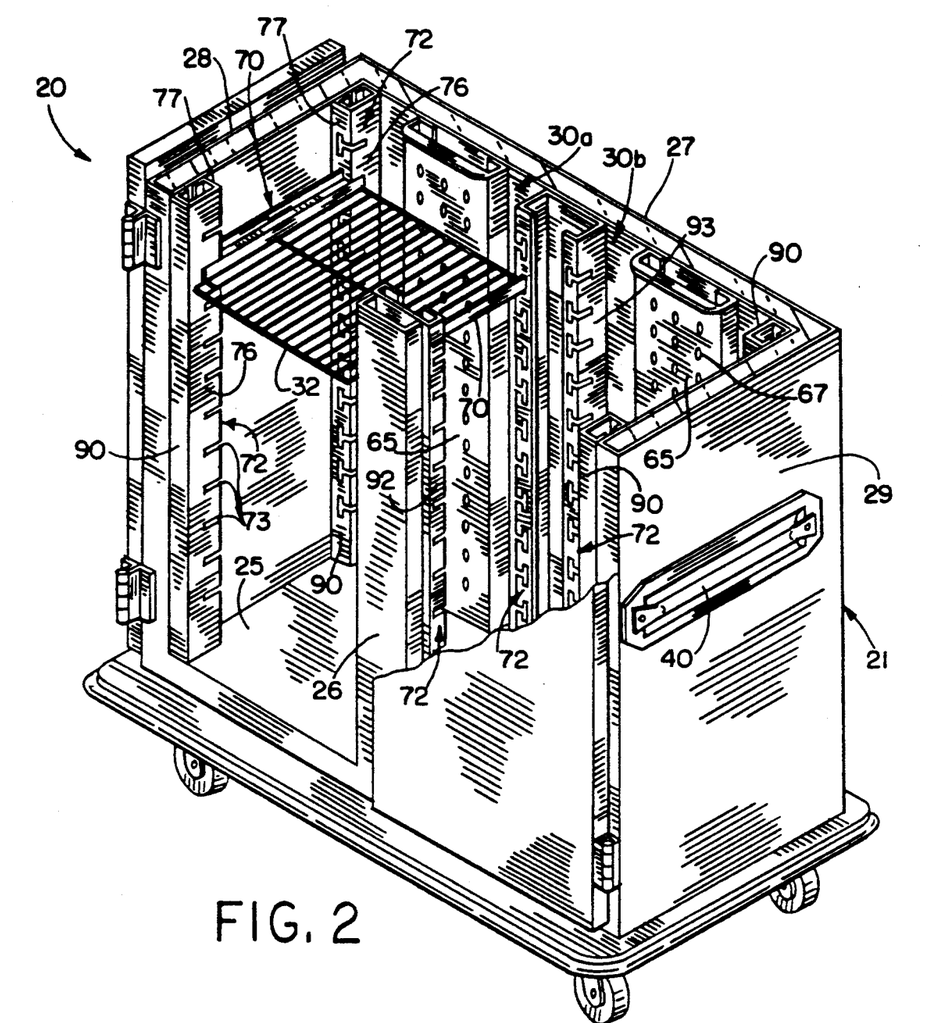
FIG. 2 is a perspective view of the food service cabinet of FIG. 1, with portions broken away and shown in section.

Referring now in detail to the drawings and initially FIGS. 1 and 2, a preferred form and type of food service cabinet according to the invention is designated generally by reference numeral 20. The illustrated cabinet is intended primarily for use as a mobile banquet cabinet designed to move food from a central kitchen to a distant area or areas for serving. Although the illustrated cabinet represents a preferred form of food service cabinet according to the invention, it will be appreciated and should be understood that the hereinafter described features of the invention will have application to other types of cabinets both separately as well as collectively.

The cabinet 20 generally comprises a box-like enclosure 21 mounted atop a base 22 which is provided with casters 23. Two or more of the casters 23 may be of the swivel-type and the remaining casters of the fixed-type, as is conventional. One or more of the casters may also be provided with a foot brake (not shown) as is conventional.

The box-like enclosure 21 includes a bottom wall 25, a front wall 26, a back wall 27 and opposite side walls 28 and 29. The walls 25–29 form therebetween a large interior compartment which is subdivided into left and right shelf compartments 30a and 30b for housing respective vertical rows of shelves, one shelf being seen at 32 in FIG. 3. The front wall 26 of the enclosure 21 is provided with left and right openings for providing access to the shelf compartments 30a and 30b, respectively. The openings are closed by respective left-hand and right-hand doors 36a and 36b. The doors 36a and 36b are provided with conventional latches 38a and 38b for holding the doors closed and hinge mounts 39a and 39b. As illustrated at the left in FIG. 2, each door can be swung open a full 270° and flush against the adjacent side wall to make loading and unloading of the cabinet quick and easy.

The doors 36a and 36b are of a double walled, insulated construction as are the walls 25–29 of the enclosure 21. The interior and exterior walls of each door or enclosure wall may be formed from stainless steel sheet metal and may contain 2 inch thick insulation, for example. The stainless steel walls may be conventionally joined together using, in particular, rivet-locked hem joints which provide a tight seam and impart rigidity to the wall panel. Although not shown, smooth cove corners may be provided around the interior base and enclosure side walls to eliminate places for food particles or grease to accumulate.

As illustrated in FIGS. 1 and 2, each side wall 28, 29 may be provided with a handle 40. The handle 40 preferably is recessed into the side wall to make it easier for the cabinet to be moved through a congested hallway, aisle or the like.

Although the illustrated enclosure 21 is provided with two shelf compartments 30a and 30b, the enclosure may have only a single shelf compartment or more than two shelf compartments, as may be desired. If plural shelf compartments are provided, they may be open to one another as shown or separated by an interior wall or walls. Each shelf compartment may have associated therewith a respective opening closed by a respective door, or a single opening and door may be shared by more than one shelf compartment. A variety of these different cabinet configurations are well known in the art.

The top edges of the enclosure walls 25–29 define an opening in the top of the enclosure 21 which is closed by a top unit 44. The top unit is intended to be easily removable for cleaning and/or exchange with one or more other top units that may perform a variety of functions in addition to closing the top of the cabinet enclosure. The top unit for example may be any one of a number of heat transfer units including refrigeration or freezer units, warming units, proofing units or baking units, among others. In the illustrated cabinet, the top unit is a heating unit. The general characteristics of the top unit will first be described and then followed by specific features of the illustrated top unit relating to its function as a heating unit.

Figure 3:
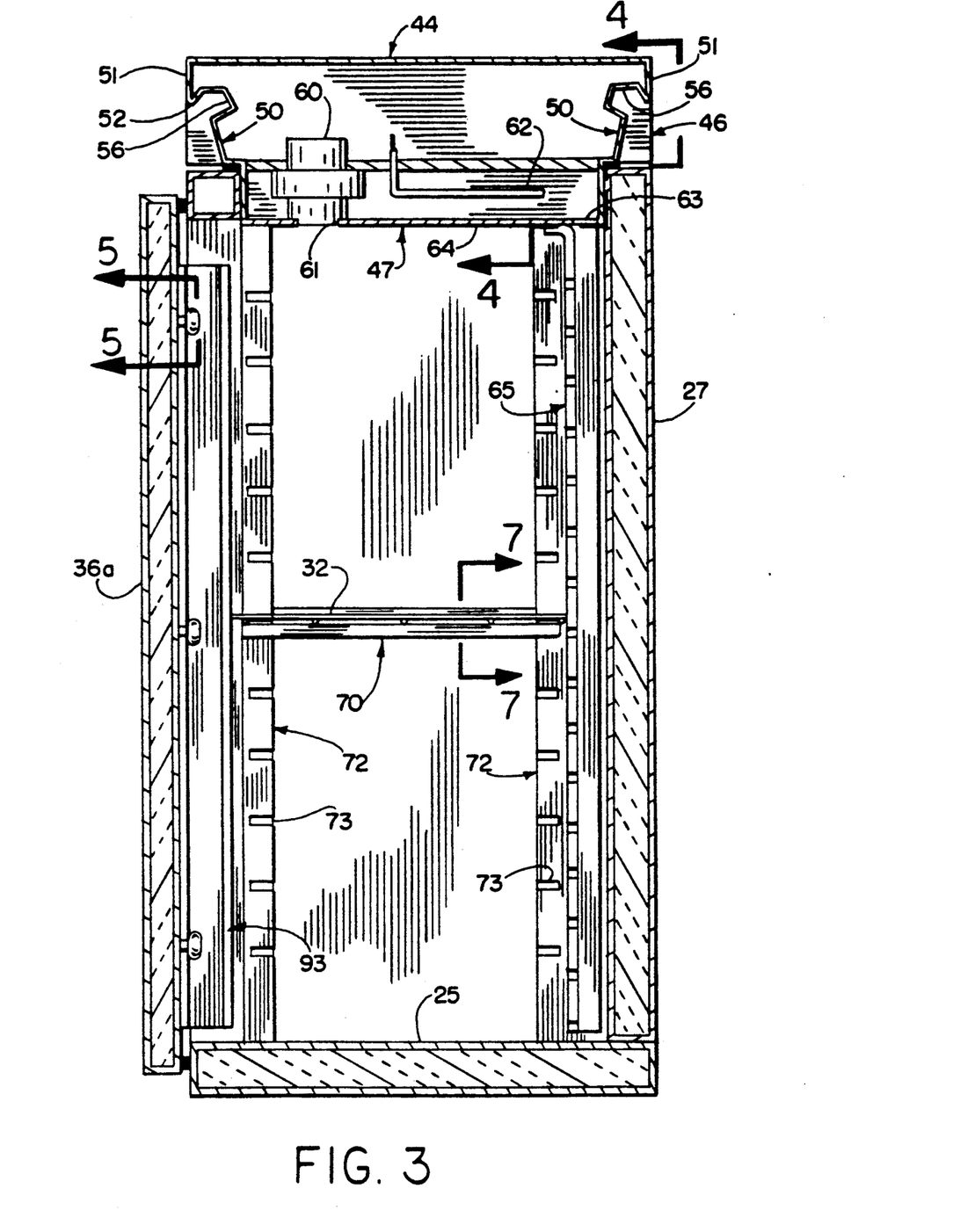
FIG. 3 is a vertical cross-sectional view of the food service cabinet.
Figure 4:
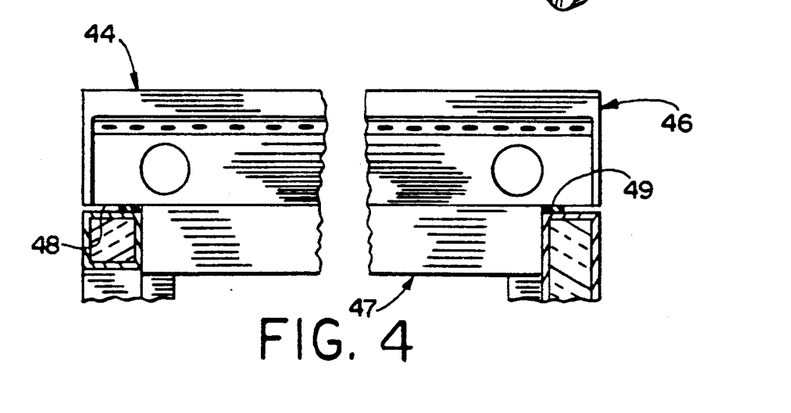
FIG. 4 is a fragmentary broken cross-sectional view of the food service cabinet taken along the line 4—4 of FIG. 3.

As best seen in FIGS. 3 and 4, the top unit 44 is characterized by an upper or head portion 46 forming a continuation of the cabinet enclosure 21 and a lower or neck portion 47. The head portion 46 projects laterally beyond the neck portion about the perimeter of the top unit to form on its underside a shoulder 48 that rests atop the top perimeter surface of the enclosure walls 26-29. As is preferred, the shoulder 48 is provided with a perimeter gasket 49 for sealing the joint between the shoulder surface and top surface of the enclosure walls 26-29. As shown, the head portion has a perimeter corresponding in size and shape to the perimeter of the enclosure 21.

When the top unit 44 is set atop the enclosure 21, the neck portion 47 extends into the interior of the enclosure. The sides of the neck portion engage the interior wall surfaces of the enclosure walls 26-29 to prevent horizontal rotation or shifting of the top unit relative to the cabinet enclosure. As shown and preferred, the neck portion of the top unit closely corresponds in cross-sectional size and shape to the opening in the top of the cabinet enclosure.

As above indicated, the top unit 44 is intended to be easily removable for cleaning and/or exchange with one or more other top units. This is greatly facilitated by the provision of front and rear hand grips extending laterally and preferably substantially the full width of the top unit. As seen in FIG. 3, the front and back sheet metal walls 50 of the head portion of the top unit are recessed to form projecting rims 51 extending along the upper edges of the front and back walls and forming the hand grips. At its outer end, each projecting rim or overhang 51 is provided with a downwardly extending lip 52 which functions as a finger catch for more secure gripping of the top unit. Also, the recessed lower portion of the wall 50 has formed therein along an upper edge thereof an outwardly opening groove 56 extending the full width of the rim to provide ample finger room for engaging the underside of the rim when lifting the top unit. As will be appreciated, two servicemen may position themselves in front of and behind the cabinet and position their fingers beneath the projecting rims 51 for lifting the top unit off of the cabinet enclosure.

Referring now to the illustrated top unit 44 in relation to its function as a heating unit, the top unit has associated with each shelf compartment 30a and 30b a fan 60 which draws air in through an inlet 61 and past an electric resistance heating element 62. After passing over the heating element, the air is forced out through an outlet opening 63 in the bottom wall 64 of the unit which coincides with the open top of a vertically extending flow distribution duct 65 attached to the back wall 27 of the cabinet. The duct 65 is formed by a sheet metal channel member of generally C-shape cross section having at the end of each leg an inturned flange for attachment to the inner wall of the back panel at a central location in relation to the respective shelf compartment. When the top unit is set atop the enclosure, preferably the bottom wall 64 of the top unit will be positioned close to if not in contact with the top edge of the duct to prevent flow losses at the junction between the outlet opening in the bottom wall of the top unit and the open top of the duct. Accordingly, the heated air will flow downwardly through the duct and into the interior of the shelf compartment via an array of openings 67 provided in the base of the U-shaped duct. Air exiting the holes at the base of the duct will be directed laterally inwardly for heating the interior of the shelf compartment from top to bottom.

In addition to providing for uniform distribution of heated air through the shelf compartment (or cooled air in the case of a refrigeration or freezer unit), each duct 65 also functions as a shelf stop for shelves in the shelf compartment. Although only one shelf is illustrated in FIG. 3, a number of shelves may be located within each shelf compartment. Various types of shelves may be used, these including wire racks, baskets, trays, plate carriers, etc.

Figure 7:
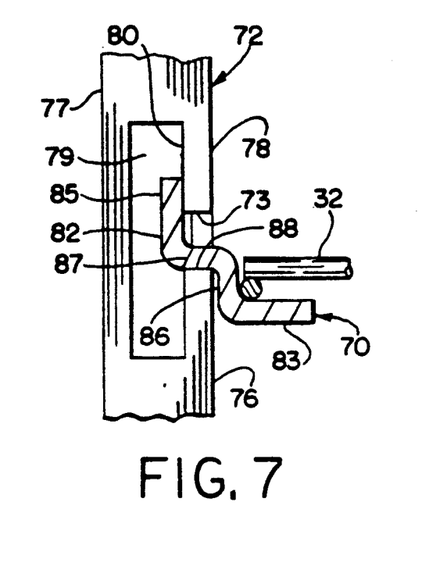
FIG. 7 is a fragmentary cross-sectional view of the food service cabinet taken along the line 7—7 of FIG. 3.

As illustrated in FIGS. 2, 3 and 7, each shelf 32 is supported by and between a pair of shelf support rails 70. Each shelf support rail in turn is supported at the ends thereof by a pair of upright posts 72. Accordingly, an upright support post is provided at the four corners of each shelf compartment. In the manner described below in greater detail, the shelf support rails are removably engaged in horizontal slots 73 in the support posts. As shown, each support post includes a number of such horizontal slots vertically spaced apart along the post to permit height adjustment of the shelf supported by the shelf support rail. The horizontal slots, for example, may be uniformly vertically spaced apart on one and one-half inch centers or any other desired spacing.

In FIGS. 2, 3 and 7, details of the shelf support rails and posts, and their manner of interengagement, are shown. In the illustrated cabinet each post 72 is formed by two angularly positioned walls with a front wall 76 extending generally parallel to the shelf support rail 70 supported thereon and a side wall 77 extending generally perpendicular to the shelf support rail. Preferably the two walls intersect at right angles to one another as shown and the front wall has an outer surface 78 coplanar with the outer surface of the other post supporting the opposite end of the same shelf support rail. Each horizontal slot 73 extends through the front wall and into the side wall to a vertically extending slot 79 forming a T with the horizontal slot 73. The vertical slot 79 at least extends vertically upwardly from the horizontal slot to define an inner surface 80 of the post, although preferably the vertical slot extends both upwardly and downwardly to provide a universal post that may be inverted for installation at either the front or back of the shelf compartment.

The shelf support rail 70 is generally L-shaped having a normally upright leg 82 for interlocking engagement in the horizontal slots and a normally horizontal leg 83 for supporting the edge of the shelf as best seen in FIG. 7. The normally upright leg 82 is transversely stepped to form an upper upright portion 85 for engaging the inner surface 80 of the post 72 above the horizontal slot 73, a lower upright portion 86 for engaging the outer surface 78 of the post below the horizontal slot, and an intermediate portion 87 joining together the upper and lower upright portions. The intermediate portion extends through the horizontal slot and is supported atop a bottom edge surface 88 of the horizontal slot. The horizontal slot is of sufficient height and sufficient clearance is provided inwardly of the inner surface 80 of the post to allow rotation of the upper portion of the normally upright leg 82 away from the inner surface of the post about a horizontal axis to an angularly rotated position permitting withdrawal of the normally upright leg from the horizontal slot.

As will be appreciated, the shelf support rail 70 has a cross-sectional shape that is similar to the profile of a common peg board hook. Moreover, the shelf support rail is attached at opposite ends thereof to respective posts in a manner similar to the manner in which a peg board hook is interlocked in a hole in a peg board. That is, the shelf support rail initially is rotated such that its normally upright leg 82 can be inserted at end portions of the rail into the horizontal slots 73 in a cooperating pair of posts. The normally upright leg is inserted into the slot sufficiently until the leading end thereof enters the vertical slot 79 at which point the shelf support rail may be further inserted into the slot and also rotated with its normally horizontal leg 83 moving downwardly and its normally upright leg moving upwardly to the position shown in FIG. 7. In this position, the upper portion 85 of the normally upright leg engages the inside surface 89 of the post whereas the lower portion 86 of the normally upright leg engages the outer surface 78 of the post to hold the shelf support rail against any appreciable horizontal movement in a direction perpendicular to its length dimension. To prevent horizontal movement of the shelf support rail in its length direction, the ends of the shelf support rail engage the ends of the horizontal slots 73 in the posts, the spacing between the ends of corresponding slots in the posts being only slightly greater than the length of the shelf support rail or at least that portion thereof engaged in the horizontal slots. As will be appreciated, the normally horizontal leg 83 of the shelf support rail may be extended beyond the posts to provide a longer shelf support surface if desired. Also, only the end portions of the shelf support rail engaged in the slots in the posts need have the above described configuration, although preferably the shelf support rail is of uniform cross section over its full length, this providing obvious manufacturing benefits.

The shelf support rail 70 will normally be held against any appreciable vertical movement by the weight of the shelf supported thereon, as well as the weight of any items supported on the shelf. The shelf weight applies a force acting downwardly on the normally horizontal leg 83 of the shelf support rail, this serving to hold the shelf support rail locked in position against any rotation that might result in the shelf support rail from disengaging from the support posts.

Although the support posts 72 employed in the illustrated cabinet are similar in the foregoing respects, the posts may be integrally embodied in different structural elements. At the corners of the cabinet enclosure 21, the support posts are integrally embodied in upright channels 90 of C-shape cross section. The base and one leg of the channel form the support post, whereas the remaining structure aids in mounting the support post to the enclosure side walls and also strengthening of the post (Such mounting is effected in the same manner as the hereinafter described shelf stop). Because of the T-shaped slot provided in the side wall of each support post and symmetry about vertical and horizontal center lines, the channels 90 may be identical thereby minimizing the total number of parts that need to be fabricated. The support posts are mounted in one orientation at the front of the enclosure and at an inverted orientation at the rear of the enclosure, such that the support posts are symmetrical with respect to a vertical plane extending parallel to the width dimension of the cabinet enclosure.

The posts 72 located between the two shelf compartments are formed integrally in front and rear channels 92 and 93 of C-shape cross section. In each of these channels, the front and side walls of each support post are formed by the legs and inturned flanges of the channel, with the inturned flanges forming the side walls and the legs forming the front walls of the support posts. The bases of the channels are attached to the inner wall surfaces of the front and rear walls 26 and 27. As best seen in FIG. 2, the legs of the rear channel 93 are sufficiently deep to accommodate the presence of the ducts 65 against which the rear edges of the shelves 32 will abut when fully inserted into the shelf compartments.

When the shelf is fully inserted into the shelf compartment, forward and rearward shifting of the shelf is prevented by the duct at the back of the compartment and a shelf stop 93 attached to the inner wall surface of the door as shown in FIG. 3. As further shown in FIGS. 5 and 6, the shelf stop 93 is a unitary channel member of C-shape cross section having a pair of legs 94 extending from a base 95 and terminating at inturned flanges. The shelf stop is attached to the inner wall surface 97 of the respective door 36 by catches or buttons 100 on the door. As shown, three vertically aligned catches are provided and the shelf stop is provided with corresponding keyholes for the catches. Preferably the catches are equally spaced apart.

According to the present invention, the keyhole 102 for each catch is formed by opposed notches 103 in the inturned flanges. The notches have recessed sides 104 forming therebetween the wide opening of the keyhole and upper oppositely sloped shoulder surfaces 105 forming therebetween the reduced width upper portion of the keyhole.

Each catch includes a base or stem 108 engagable by the shoulder surfaces 105 of the inturned flanges of the channel member in a wedge-like manner vertically to support the channel member. The catch further includes a flange or head portion 109 spaced from the interior surface 97 of the wall for capturing therebetween a portion of the inturned flanges to hold the inturned flanges 96 against the interior surface of the wall in an engaged position of the channel member. The channel member is vertically upwardly moveable from such engaged position to a release position vertically withdrawing the inturned flanges from between the catch flange and aligning the wide opening 110 with the catch flange for permitting passage of the catch flange through the opening when the channel member is moved horizontally away from the interior surface of the wall.

In the illustrated embodiment, the catch is in the form of a button with the base or stem 108 being formed by an upset central portion of the button and the flange or head portion 109 being formed by a annular flange extending circumferentially around the base. This construction allows the catch to be mounted to the door panel as by means of a central rivet 113 or other fastener without having to be concerned with a specific angular orientation of the catch inasmuch as the catch may be rotated about its center axis and still function as aforedescribed.

Figure 5:
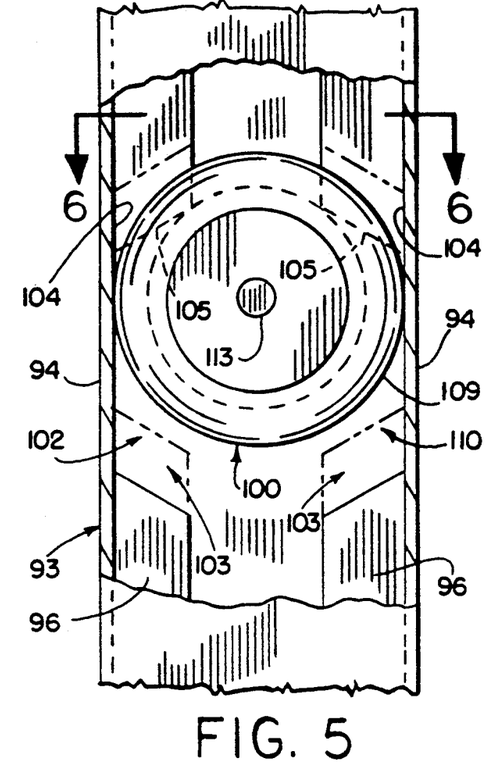
FIG. 5 is a fragmentary cross-sectional view of the food service cabinet taken along the line 5—5 of FIG. 3.
Figure 6:
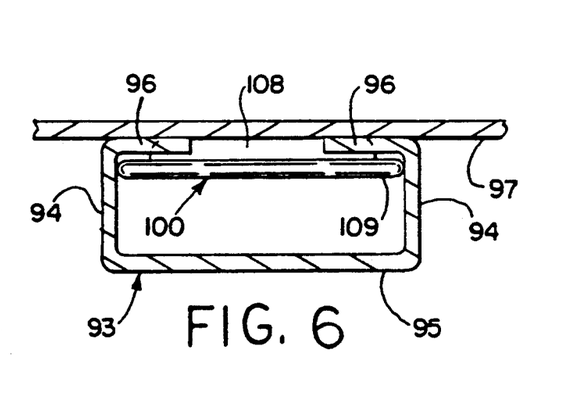
FIG. 6 is a fragmentary cross-sectional view of the food service cabinet taken along the line 6—6 of FIG. 5.

In the same manner, the upright channels 90 may be attached to respective walls of the cabinet enclosure which walls are provided with catches. That is, the inturned flanges of the C-shape channels may be notched as shown in FIG. 5 to receive and interengage with a corresponding catch on the wall to which the channel is to be mounted. Preferably at least two catches and corresponding recesses are provided normally near the top and bottom of the channel.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. In a food service cabinet, a wall having an interior surface; a catch on said wall, said catch having a stem portion extending from said interior surface and a wider head portion spaced from said interior surface and forming a slot therebetween; and an upright channel member of generally C-shape cross section having a pair of legs extending from a base to respective inturned flanges, said inturned flanges including a keyhole having a lower portion for passage of the head portion of said catch and a reduced width upper portion receiving said base, said inturned flanges having inner edges and said keyhole being formed by opposed notches in said inturned edges.

2. A food service cabinet as set forth in claim 1, comprising a shelf support rail attached to said upright channel member for supporting a shelf along an edge of the shelf.

3. A food service cabinet as set forth in claim 1, comprising a shelf support rail for supporting a shelf along an edge of the shelf, and wherein said upright channel member includes means cooperative with said shelf support rail for removably supporting said shelf support rail on said upright channel member.

4. A food service cabinet as set forth in claim 3, wherein said means for removably supporting includes a slot in said upright channel member, and said rail is generally L-shaped in cross-section having a normally upright leg configured for interlocking engagement in said slot in said upright channel member.

5. A food service cabinet as set forth in claim 1, wherein two said catches are vertically spaced apart on said wall, and said inturned flanges of said upright channel member include two said keyholes spaced apart along the length of said channel member by a distance equal the vertical spacing between said catches.

6. A food service cabinet as set forth in claim 5, wherein said channel member is symmetrical about vertical and horizontal center lines for mounting in either one of oppositely inverted upright positions.

7. A food service cabinet as set forth in claim 1, wherein said wider head portion is formed by an annular flange extending circumferentially around said stem portion.

8. A food service cabinet comprising an enclosure having an open top, a removable top unit for closing said open top, said top unit including hand grips at opposite sheet metal side walls of said top unit, said hand grips extending substantially the full width of said sheet metal side walls, each said sheet metal side wall having a lower recessed wall portion from which a laterally extending rim projects to form said hand grip.

9. A food service cabinet as set forth in claim 8, wherein said removable top unit includes a lower neck portion and an upper head portion projecting laterally beyond said lower neck portion about the perimeter of said top unit to form on its underside a shoulder that rests atop said enclosure.

10. A food service cabinet as set forth in claim 9, wherein the sides of said head portion of said top unit are flush with respective sides of said enclosure.

11. A food service cabinet as set forth in claim 9, wherein said enclosure has interior wall surfaces defining an opening in said open top, said neck portion being received in said opening and having respective sides thereof engaging said interior wall surfaces of said enclosure to prevent horizontal movement of said top unit relative to said enclosure.

12. A food service cabinet as set forth in claim 8, wherein said laterally extending rim has at its outer edge a downwardly extending lip which functions as a finger catch.

13. A food service cabinet as set forth in claim 8, wherein said top unit houses a heat transfer means for transferring heat with respect to the interior of said enclosure.

14. In a food service cabinet comprising an enclosure; a pair of upright posts in said enclosure; a shelf support rail for supporting a shelf along an edge of the shelf; said shelf support extending horizontally between said upright posts and being removably supported at end portions thereof by said upright posts; each said post being formed by angularly positioned upright walls including a front wall and a side wall, said front wall extending generally parallel to said shelf support rail and coplanar with the front wall of the other post, said side wall extending generally perpendicular to said shelf support rail; each said post having a horizontal slot extending from an outer surface of said post through said front wall and into said side wall to a vertically extending slot in said side wall, said vertically extending slot at least extending vertically upwardly from the horizontal slot to define an inner surface of said post which extends upwardly from said horizontal slot; and said shelf support rail at least at said end portions thereof being generally L-shape in cross-section and having a normally upright leg for interlocking engagement in the horizontal slots in said upright posts and a normally horizontal leg for supporting the edge of the shelf; said normally upright leg being transversely stepped to form an upper upright portion for engaging said inner surface of said post above said horizontal slot, a lower upright portion for engaging said outer surface of said post below said horizontal slot, and an intermediate portion joining together said upper and lower upright portions; said intermediate portion extending through said horizontal slot and being supported atop a bottom edge surface of said horizontal slot; and wherein said horizontal slot is of sufficient height and sufficient clearance is provided inwardly of said inner surface of said post to allow rotation of said upper upright portion inwardly of said inner surface of said post to allow rotation of said upper upright portion away from said inner surface of said post about a horizontal axis to an angularly rotated position permitting withdrawal of said normally upright leg from said horizontal slot.

15. A food service cabinet as set forth in claim 14, wherein said enclosure has upright wall panels to which said posts are removably mounted at first and second positions, said posts being identical and invertible for mounting at either one of said first and second positions, and said vertically extending slot in said side wall of each post extending both upwardly and downwardly from said horizontal slot to permit attachment of said shelf support rail to said posts in either one of the relatively inverted orientations of said posts.

16. A food service cabinet as set forth in claim 14, wherein said posts are generally C-shape in cross-section having a pair of legs extending from a base to respective inturned flanges, and said base and one said leg form said front and side walls.

17. A food service cabinet as set forth in claim 16, wherein said enclosure has a wall panel having an interior surface, and further comprising a catch on said wall panel, said catch having a stem portion extending from said interior surface and a wider head portion spaced from said interior surface and forming a slot therebetween, said inturned flanges including a keyhole having a lower portion for passage of the head portion of said catch and a reduced width upper portion receiving said base, and said inturned flanges having inner edges and said keyhole being formed by opposed notches in said inner edges.

18. A food service cabinet as set forth in claim 14, wherein said enclosure has an open top, and further comprising a removable top unit for closing said open top, said top unit including hand grips at opposite sheet metal side walls of said top unit, said hand grips extending substantially the full width of said sheet metal side walls, and each said sheet metal side wall having a lower recessed wall portion from which a laterally extending rim projects to form said hand grip.

* * * * *